United States Patent Office 3,314,918
Patented Apr. 18, 1967

3,314,918
OXYMETHYLENE POLYMERS STABILIZED WITH A COMBINATION OF CYCLIC AMIDINE COMPOUNDS AND AMINO SUBSTITUTED AMIDES
Frank M. Berardinelli, South Orange, and Thomas J. Dolce, Springfield, N.J., assignors to Celanese Corporation of America, New York, N.Y., a corporation of Delaware
No Drawing. Filed Oct. 25, 1962, Ser. No. 233,143
12 Claims. (Cl. 260—45.8)

This invention relates to compositions based on oxymethylene polymers which have high thermal stability and resistance to discoloration.

High molecular weight oxymethylene polymers may be prepared in high yields and at rapid reaction rates by the use of acidic boron fluoride-containing catalysts such as boron fluoride itself, and boron fluoride coordinate complexes with organic compounds in which oxygen or sulfur is the donor atom, as described in U.S. Patents 2,989,506 and 2,989,507 of Hudgin and Berardinelli, the disclosures of which are incorporated herein by reference.

Oxymethylene polymers of improved thermal stability and having carbon-to-carbon bonds in the main polymer chain have been prepared by copolymerizing trioxane with from 0.5 to 25 mol percent of a cyclic ether having adjacent carbon atoms. Copolymers of this type are described in Patent No. 3,027,352 of Walling et al., the disclosure of which is incorporated herein by reference. The preferred copolymers are those made up by oxymethylene and oxyethylene groups, such as copolymers of trioxane with dioxolane or with ethylene oxide.

It is an object of this invention to provide oxymethylene polymer based compositions which have high thermal stability and good resistance to discoloration on exposure to heat. It is a further object of this invention to improve the thermal stability and resistance to discoloring of an oxymethylene based polymer by means of a selected combination of stabilizing compounds. Other objects will be apparent from the following detailed description and claims.

In accordance with one aspect of the invention, an oxymethylene polymer is mixed with a cyclic amidine compound, e.g., having a ring carbon doubly bonded to one ring nitrogen atom and singly bonded to another ring nitrogen atom, and a compound containing both amine and amide groups and having from 0.2 to 5 amide groups per amino nitrogen atom. For convenience, the latter compounds are hereinafter designated as "amine-amides." Preferably, both stabilizing compounds are devoid of carbon-to-carbon ethylenic unsaturation.

The preferred cyclic amidine compounds contain at least one amidino group per 22 carbon atoms with the residual valence of the amidino group bonded to nitrogen, carbon, oxygen or hydrogen. Particularly suitable compounds are the amine substituted triazines, e.g., amine-substituted derivatives of symmetrical triazines, including melamine (2,4,6-triamino sym. triazines). The amino groups may be primary, secondary or tertiary and other substituents such as hydroxy substituents may be present. Among the specific compounds which are suitable are 2,4,6-triamino sym. triazine (melamine), N,N-diethyl melamine, phenyl melamine, butyl melamine, N,N-diphenyl melamine, N,N',N''-triphenyl melamine, N,N',N''-trimethylol melamine, 2,4-diamino-6-methyl sym. triazine, 2,4-diamino-6-butyl sym. triazine, 2,4-diamino-6-benzyloxy sym. triazine, 2,4-diamino-6-butoxy sym. triazine, 2,4-diamino-6-benzyloxy sym. triazine, 2,4-diamino-6-butoxy sym. triazine, 2,4-diamino-6-cyclo-hexyloxy sym. triazine, 2,4-diamino-6-chloro sym. triazine, 2,4-diamino-6-mercapto sym. triazine, 2,4-dihydroxy-6-amino sym. triazine (ammelide), 2-hydroxy 4,6-diamino sym. triazine (ammeline) and N,N,N',N' tetracyanoethyl benzoquanamine.

The cyclic amidine compound may be used, for example, in an amount of .01 to 5%, preferably 0.05 to 0.15% based on the weight of the oxymethylene polymer. The particularly preferred cyclic amidine compound is melamine.

The preferred "amine-amides" are compounds wherein the amine groups are tertiary amine groups and wherein there are from one to three amide groups per amino nitrogen atom. Suitable "amine-amides" include compounds containing the structure N—R$_1$—Z—R$_2$ wherein R$_1$ is a divalent organic radical having terminal carbon bonds, Z is a

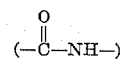

group which may be in any position with respect to the other atoms of the molecule, and R$_2$ is hydrogen or a monovalent organic radical having a terminal carbon bond, e.g., an alkyl or aryl group either unsubstituted or containing only inert substituents. The preferred compounds are compounds in which R$_2$ is hydrogen and the free nitrogen bonds are singly linked to carbon atoms; such compounds have terminal amide groups, i.e.,

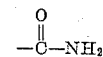

groups and tertiary amino groups. The free nitrogen bonds at the left of the formula in the preferred compounds may be linked to alkyl groups, aryl groups or may be linked through carbon atoms to the other atoms of a heterocyclic ring. The free nitrogen bonds may be linked to additional radicals having amide groups. If desired, the radicals linked to the free nitrogen bonds may have one or more additional tertiary amino nitrogen atoms in their skeletons or may even comprise a repeating polymeric structure.

The divalent radical R$_1$ may suitably be an alkylene radical, such as a methylene, ethylene or butylene radical, or an arylene radical, such as a phenylene radical. These radicals may be unsubstituted or may contain substituents which are inert. The divalent radicals may also, if desired, have one or more additional tertiary nitrogen atoms in their skeletons.

Among the specific tertiary amine-amides which are suitable are nitrilo-tris-beta propionamide; beta (4-morpholinyl) propionamide; N,N-dimethyl-p-carbamyl aniline; 4-diethylamino-2-methyl acetanilide and p-diethyl-amino acetanilide.

The amine-amide compound may be used, for example, in an amount of .01 to 5%, preferably 0.1 to 0.5% based on the weight of the oxymethylene polymer. The particularly preferred amine-amide compound is nitrilo-tris-beta-propionamide, N(—CH$_2$CH$_2$CONH$_2$)$_3$.

In accordance with another aspect of the invention, compositions having particularly good thermal stability in addition to good resistance to discoloration on exposure to heat are prepared by adding to the composition, as a thermal stabilizer, a phenolic compound.

The phenolic compound is preferably an alkylene bisphenol including alkylene bisphenols with alkyl substituents on the benzene rings. A suitable class of alkylene bisphenols includes compounds having from 1 to 4 carbon atoms in the alkylene group and having from zero to 2 alkyl substituents on each benzene ring, each alkyl substituent having from one to four carbon atoms. The preferred alkylene bisphenol is 2,2'-methylene-bis(4-methyl-6-tertiary butyl phenol) which has been found to be substantially more effective than even its homolog 2,2'-methylene-bis(4-ethyl-6-tertiary butyl phenol). Other phenolic compounds which may be used are alkyl phenols containing 1 to 3 alkyl groups each of which has up to 8 carbon atoms, e.g., 2,6-ditertiary butyl-4-methyl phenol, and octyl phenol, and aryl phenols such as p-phenyl phenols.

The phenolic compound may be used, for example, in an amount of .01 to 10% based on the weight of the polymer. Preferably an amount between about 0.1 and about 1 weight percent is used.

In accordance with a preferred aspect of the invention, the stabilizing compounds are added to an oxymethylene polymer containing carbon-to-carbon single bonds in the main polymer chain and, particularly, to a copolymer containing recurring oxymethylene units interspersed with —OR— groups in the main polymer chain where R is a divalent radical containing at least two adjacent carbon atoms in the chain between the valences, any substituents on said R radical being inert, and wherein the —OR— groups constitute from 0.5 to 25 mol percent of the polymer. R may be, for example, an alkylene or substituted alkylene group containing at least two carbon atoms. Examples of polymers of this type are copolymers of trioxane and a cyclic ether containing at least two adjacent carbon atoms, such as the copolymers disclosed in Patent No. 3,027,352.

The admixture of oxymethylene polymer and stabilizing compounds may be made by dry blending the finely divided oxymethylene polymer and finely divided stabilizers or by milling the stabilizers into the polymer as the latter is worked on a rubber mill or extruded. Alternatively, the compounds may be admixed intimately with the oxymethylene polymer by being applied in solution in a suitable solvent to the finely divided solid oxymethylene polymer followed by evaporation of the solvent. Some solvents which can be used to dissolve the stabilizing compounds are, for example, water, dimethyl formamide, ethylene glycol, ethyl alcohol.

The compositions of this invention may also include, if desired, plasticizers, fillers, pigments and other stabilizers.

The following examples further illustrate the invention with a particularly preferred combination of stabilizers which yields especially good results in terms of thermal stability, resistance to discoloration under varying conditions, and absence of exudation.

*Example I*

A copolymer of trioxane and ethylene oxide which was prepared with the aid of a boron trifluoride catalyst and was thermally aftertreated to remove 5–10% oxymethylene groups at the ends of the polymer chains, and which contained 2% of combined ethylene oxide based on the weight of the copolymer and had an inherent viscosity of 1.3 (measured at 60° C. from a solution containing 0.1 weight percent of polymer in p-chlorophenol containing 2 weight percent of alpha-pinene), was mixed with 0.1 weight percent of melamine, 0.3 weight percent of nitrilo-tris-beta-propionamide, and 0.5 weight percent of 2,2'-methylene bis(4-methyl-6-t-butyl phenol), based on the weight of the copolymer. The components were mixed at 200° C. for 7 minutes in a "Plastograph," double roll miller with shallow contour screw surfaces.

The composition was compression molded at 190° C. and 1700 p.s.i. for 5 minutes to produce an 11 gram disc having a diameter of 2¼ inches and a thickness of 42–47 mils for measurement of initial color.

A sample of the polymer was charged to a Melt Indexer where it was held at 230° C. for 30 minutes. This composition was then compression molded into a disc as described above for color measurement.

The color of the discs was measured on a standard Hunter Color Difference Meter. It was found that the disc prepared from the original stabilized polymer had an "L" value (measure of lightness) of 87.9 and a "b" value (measure of degree of yellowness) of 7.7, whereas the disc prepared from the composition which was subjected to a temperature of 230° C. for 30 minutes in the Melt Indexer had an "L" value of 86.3 and a "b" value of 12.9 indicating a relatively slight change in color as a result of being subjected to molding conditions.

In addition, the stabilized polymer composition of this example had an average thermal degradation rate of 0.014% per minute at 230° C. and 0.22% per minute at 270° C. on being heated in a circulating air oven to the indicated temperature while in a container covered with a vented lid giving limited access to air.

After being heated at 230° C. for 5½ hours in a circulating air oven, the stabilized composition of this invention lost only 9.6% of its weight.

*Example II*

The copolymer described in Example I was mixed with 0.15% of melamine, 0.10% of nitrilo-tris-beta-propionamide, and 0.50% of 2,2'-methylene bis(4-methyl-6-t-butyl phenol), based on the weight of the copolymer, by blending the materials for two hours at room temperature in a Patterson-Kelly Twin Cone blendor. This was followed by extrusion of the polymer in a one-inch by twenty-inch screw extruder. The temperature of the sample at mid screw was 420° F. and at the end of the screw was 385° F., and the screw speed was 40 r.p.m. The polymer was collected as pellets and stability tests were run on these.

A disc prepared from the pellets before further treatment had a Hunter "L" value of 87.8 and a "b" value of 5.4. The polymer composition had average degradation rates of 0.013% per minute at 230° C. and 0.22% per minute at 270° C., and lost only 8.9 to 12.2% of its weight after being held for 5½ hours at 230° C. in a container covered with vented lid giving limited access to air.

After the composition of this example was held in the Melt Indexer for 30 minutes at 230° C., a disc prepared from it had an "L" value of 83.6 and a "b" value of 11.6.

A disc prepared from the composition of this example was held in an air atmosphere at 250° F. for seven days. The disc had an "L" value of 87.8 and a "b" value of 9.1.

In addition to the advantages brought out above, the compositions of the above examples showed no visible signs of exudation after being kept at 250° F. for 5 to 7 days.

In addition to the methods disclosed in U.S. Patents Nos. 2,989,506, 2,989,507 and 3,027,352, other methods may be used to prepare oxymethylene polymers contemplated under this invention, including for example, those taught by Kern et al. in Angewandt Chemie 73 (6), pages 177 to 186 (March 21, 1961).

Mixtures of an oxymethylene homopolymer and the additive compounds of this invention are contemplated under this invention. Some suitable homopolymers which may be used are those in which the end groups have been reacted with an alkanoic acid such as acetic acid or an ether such as dimethyl ether as described in the aforementioned Kern et al. article. These reactants cause stable ester or ether end groups, e.g., acetyl or methoxy groups, to form at the ends of the polymer molecules. Compositions under this invention comprising an oxymethylene homopolymer and the above-described additive compounds may be prepared as described in the foregoing examples, except that the copolymer is replaced by the homopolymer.

It is to be understood that the foregoing detailed description is given merely by way of illustration and that many variations may be made therein without departing from the spirit of our invention.

Having described our invention what we desire to secure by Letters Patent is:

1. A moldable composition comprising an oxymethylene polymer, an amine-substituted symmetrical triazine and a tertiary amine compound containing from one to three terminal amide groups per tertiary amino nitrogen atom.

2. A moldable composition comprising an oxymethylene polymer, melamine, and nitrilo-tris-beta-propionamide.

3. A moldable composition comprising an oxymethylene polymer, 0.005 to 015% of melamine and 0.1 to 0.5% of nitrilo-tris-beta-propionamide, based on the weight of the polymer.

4. A moldable composition comprising an oxymethylene polymer having repeating carbon-to-carbon bonds in the main polymer chain, an amine-substituted symmetrical triazine and a tertiary amine compound containing from one to three terminal amide groups per tertiary amino nitrogen atom.

5. A moldable composition comprising an oxymethylene polymer having repeating carbon-to-carbon bonds in the main polymer chain, melamine and nitrilo-tris-beta-propionamide.

6. A moldable composition comprising a copolymer containing from 75 to 99.5 mol percent of recurring oxymethylene units, interspersed with —OR— groups, R being a divalent organic radical having at least two adjacent carbon atoms between the valences, any substituents on said R radicals being inert, an amine-substituted symmetrical triazine and a tertiary amine compound containing from one to three terminal amide groups per tertiary amino nitrogen atom.

7. A composition comprising a trioxanecyclic ether copolymer containing from 75 to 99.5 mol percent of recurring oxymethylene units, said cyclic ether having at least two adjacent carbon atoms, melamine and nitrilo-tris-beta-propionamide.

8. A moldable composition comprising a trioxanecyclic ether copolymer containing from 75 to 99.5 mol percent of recurring oxymethylene units, said cyclic ether having at least two adjacent carbon atoms, 0.05 to 0.15% of melamine, and 0.1 to 0.5% of nitrilo-tris-beta-propionamide, based on the weight of copolymer.

9. The composition of claim 8 wherein said cyclic ether is ethylene oxide.

10. A moldable composition comprising an oxymethylene polymer, an amine-substituted symmetrical triazine a tertiary amine compound containing from one to three terminal amide groups per tertiary amino nitrogen atom, and a phenolic stabilizer selected from the group consisting of alkylene bisphenols and alkyl phenols containing one to three alkyl groups, each of which has up to eight carbon atoms per alkyl group.

11. A composition of claim 10 wherein said phenolic stabilizer is an alkylene bisphenol having from one to four carbon atoms in the alkylene group and having from zero to two alkyl substituents on each benzene ring, with each alkyl substituent having from one to four carbon atoms.

12. The composition of claim 11 wherein said alkylene bisphenol is 2,2′-methylene-bis(4-methyl-6-t-butyl phenol).

References Cited by the Examiner

UNITED STATES PATENTS

| | | | |
|---|---|---|---|
| 2,944,999 | 7/1960 | Abbruscato | 260—45.8 |
| 3,103,499 | 9/1963 | Dolce et al. | 260—45.95 |
| 3,169,926 | 2/1965 | Symon | 260—45.9 |
| 3,274,149 | 9/1966 | Berardinelli | 260—45.8 |

DONALD E. CZAJA, *Primary Examiner.*

LEON J. BERCOVITZ, M. J. WELSH,
*Assistant Examiners.*